United States Patent
He

(10) Patent No.: US 9,086,115 B2
(45) Date of Patent: Jul. 21, 2015

(54) DAMPER ASSEMBLY FOR CHAIN OR BELT DRIVE

(71) Applicant: Schaeffler Technologies GmbH & Co. KG, Herzogenaurach (DE)

(72) Inventor: Simon Xunnan He, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 3 days.

(21) Appl. No.: 14/165,993

(22) Filed: Jan. 28, 2014

(65) Prior Publication Data

US 2014/0228159 A1 Aug. 14, 2014

Related U.S. Application Data

(60) Provisional application No. 61/762,521, filed on Feb. 8, 2013.

(51) Int. Cl.
| | |
|---|---|
| *F16H 55/30* | (2006.01) |
| *F16F 15/131* | (2006.01) |
| *F16H 7/02* | (2006.01) |
| *F16F 15/14* | (2006.01) |
| *F16H 7/06* | (2006.01) |

(52) U.S. Cl.
CPC ......... *F16F 15/13128* (2013.01); *F16F 15/145* (2013.01); *F16H 7/023* (2013.01); *F16H 7/06* (2013.01); *Y10T 29/49453* (2015.01)

(58) Field of Classification Search
CPC . F16H 55/30; F16H 55/171; F16H 2055/306; F16H 7/023; B62M 9/10
USPC .................................................. 474/152, 94
See application file for complete search history.

(56) References Cited

U.S. PATENT DOCUMENTS

| | | | | | |
|---|---|---|---|---|---|
| 2,214,921 | A | * | 9/1940 | Criswell | 74/574.3 |
| 2,411,373 | A | * | 11/1946 | Holowenko | 74/574.3 |
| 3,304,924 | A | * | 2/1967 | Dolza | 123/90.31 |
| 4,095,579 | A | * | 6/1978 | Iwasa et al. | 123/192.2 |
| 4,317,388 | A | * | 3/1982 | Wojcikowski | 74/574.2 |
| 4,576,587 | A | * | 3/1986 | Nagano | 474/152 |
| 5,413,535 | A | * | 5/1995 | Reik | 474/94 |
| 5,579,665 | A | * | 12/1996 | Mott et al. | 74/574.2 |
| 6,220,970 | B1 | * | 4/2001 | Berger et al. | 464/180 |
| 6,234,127 | B1 | * | 5/2001 | Simpson et al. | 123/90.31 |
| 6,601,472 | B1 | * | 8/2003 | Baron | 464/180 |
| 7,232,391 | B2 | * | 6/2007 | Gajewski | 474/141 |
| 7,720,650 | B2 | | 5/2010 | Gajewski | |
| 8,161,739 | B2 | * | 4/2012 | Degler et al. | 60/338 |
| 2002/0019263 | A1 | * | 2/2002 | Jackel et al. | 464/67 |

(Continued)

*Primary Examiner* — Henry Liu
(74) *Attorney, Agent, or Firm* — Simpson & Simpson, PLLC

(57) ABSTRACT

A chain or belt drive assembly, including: a first sprocket with: a first plurality of radially outwardly extending protrusions; and at least one opening passing through material forming the sprocket and wholly surrounded by the material forming the first sprocket; and a second sprocket including a second plurality of radially outwardly extending protrusions, The assembly includes a continuous chain or belt engaged with the first and second pluralities of protrusions; and at least one pendulum mass assembly including: a first pendulum mass disposed on a first radial side of the first sprocket; second pendulum mass disposed on a second radial side, opposite the first radial side, of the first sprocket; and at least one connection element fixedly secured to the first and second pendulum masses and passing through the at least one opening. The connection element is displaceable within the at least one opening in radial and circumferential directions.

13 Claims, 5 Drawing Sheets

(56) References Cited

U.S. PATENT DOCUMENTS

| | | | |
|---|---|---|---|
| 2004/0149075 A1* | 8/2004 | Williams | 74/574 |
| 2006/0046859 A1* | 3/2006 | Brosowske | 464/62.1 |
| 2010/0175956 A1* | 7/2010 | Zadoks | 188/268 |
| 2011/0179782 A1* | 7/2011 | Huegel et al. | 60/338 |
| 2012/0000446 A1* | 1/2012 | Venton-Walters et al. | 123/564 |
| 2012/0055281 A1* | 3/2012 | Huegel | 74/574.2 |
| 2013/0283966 A1* | 10/2013 | Baral et al. | 74/574.2 |
| 2013/0283967 A1* | 10/2013 | Movlazada | 74/574.2 |
| 2014/0013899 A1* | 1/2014 | Krause et al. | 74/574.2 |
| 2014/0026712 A1* | 1/2014 | Movlazada | 74/574.2 |

* cited by examiner

DAMPER ASSEMBLY FOR CHAIN OR BELT DRIVE

CROSS-REFERENCE TO RELATED APPLICATIONS

This application claims the benefit under 35 U.S.C. §119 (e) of U.S. Provisional Application No. 61/762,521, filed Feb. 8, 2013, which application is incorporated herein by reference in its entirety.

TECHNICAL FIELD

The present disclosure relates to a damper assembly for a chain or belt drive, in particular to a damper assembly including pendulum masses for an engine timing chain assembly.

BACKGROUND

An engine timing chain assembly includes two sprockets, connected by a timing chain, driving a camshaft. Torque transmitted to the camshaft undesirably varies because of oscillation from the engine. For example, second, third, or fourth order oscillation caused by four, six, or eight cylinder engines, respectively, causes the torque variation. Undesirable vibration of the timing chain occurs in response to the torque variation of the camshaft. The torque variation and chain vibration interfere with proper operation of the engine timing chain assembly and cause premature wear of the components of the engine timing chain assembly.

SUMMARY

According to aspects illustrated herein, there is provided a chain or belt drive assembly, including: a first sprocket with: a first plurality of radially outwardly extending protrusions; and at least one opening passing through material forming the sprocket and wholly surrounded by the material forming the first sprocket; and a second sprocket including a second plurality of radially outwardly extending protrusions. The assembly includes a continuous chain or belt engaged with the first and second pluralities of protrusions; and at least one pendulum mass assembly including: a first pendulum mass disposed on a first radial side of the first sprocket; second pendulum mass disposed on a second radial side, opposite the first radial side, of the first sprocket; and at least one connection element fixedly secured to the first and second pendulum masses and passing through the at least one opening. The at least one connection element is displaceable within the at least one opening in radial and circumferential directions.

According to aspects illustrated herein, there is provided a method of fabricating a chain or belt drive assembly, including: fixedly securing at least one connection element to at least one first pendulum mass; passing the at least one connection element through at least one opening in a first sprocket, the at least one opening passing through material forming the sprocket and wholly surrounded by the material forming the first sprocket; disposing the at least one first pendulum mass on a first radial side of the first sprocket; fixedly securing the at least one connection element to at least one second pendulum mass disposed on a second radial side of the first sprocket, opposite the first radial side; engaging a continuous chain or belt with a first plurality of radially outwardly extending protrusions on the first sprocket; and engaging the continuous chain or belt with a second plurality of radially outwardly extending protrusions on a second sprocket. The at least one connection element is displaceable within the at least one opening in radial and circumferential directions.

According to aspects illustrated herein, there is provided an engine timing chain assembly, including a first sprocket with: a first plurality of radially outwardly extending protrusions; and a plurality of pairs of first and second openings, each first and second opening passing through material forming the sprocket and wholly surrounded by the material forming the first sprocket; a second sprocket including a second plurality of radially outwardly extending protrusions; a continuous chain or belt engaged with the first and second pluralities of protrusions; and a plurality of pendulum mass assemblies, each pendulum mass assembly including: a respective first pendulum mass disposed on a first radial side of the first sprocket; a respective second pendulum mass disposed on a second radial side, opposite the first radial side, of the first sprocket; and a respective pair of first and second connection elements fixedly connected to the respective first and second pendulum masses. Each first connection element passes through a respective first opening. Each second connection element passes through a respective second opening. Each first connection element is displaceable within the respective first opening in radial and circumferential directions. Each second connection element is displaceable within the respective second opening in the radial and circumferential directions.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
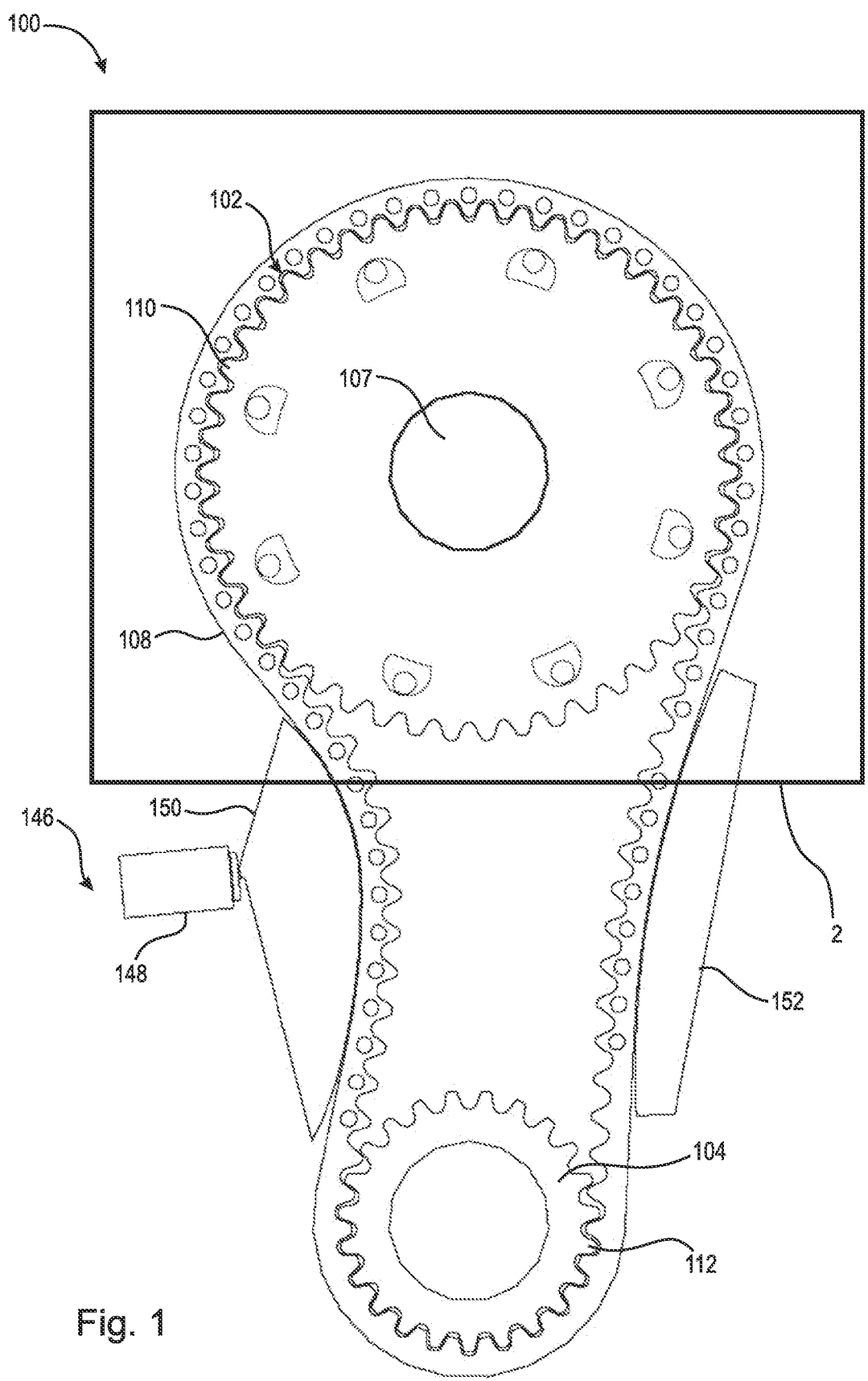
FIG. 1 is a front view of an engine timing chain assembly.
Figure 2:
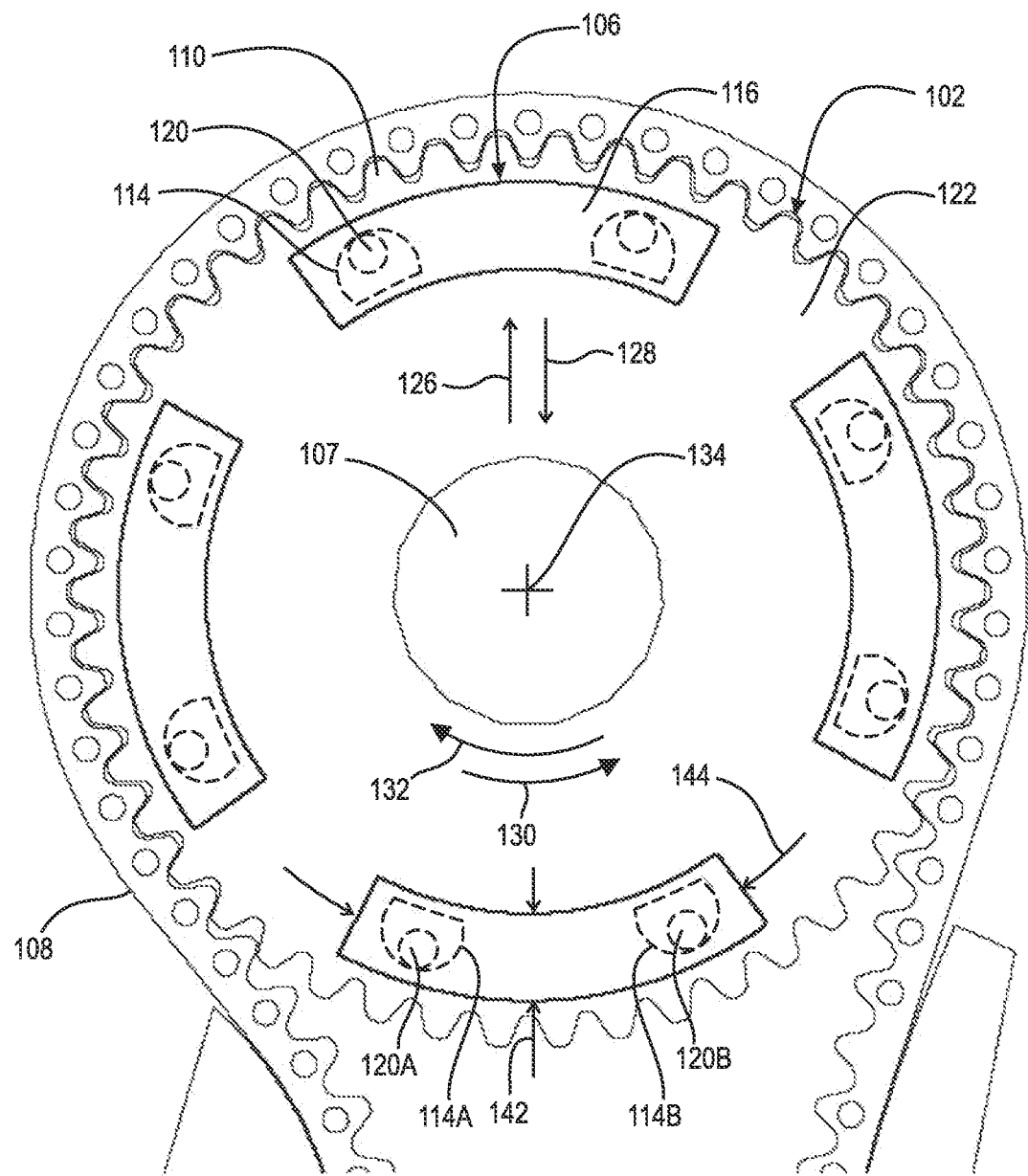
FIG. 2 is detail of area 2 in FIG. 1.
Figure 3:
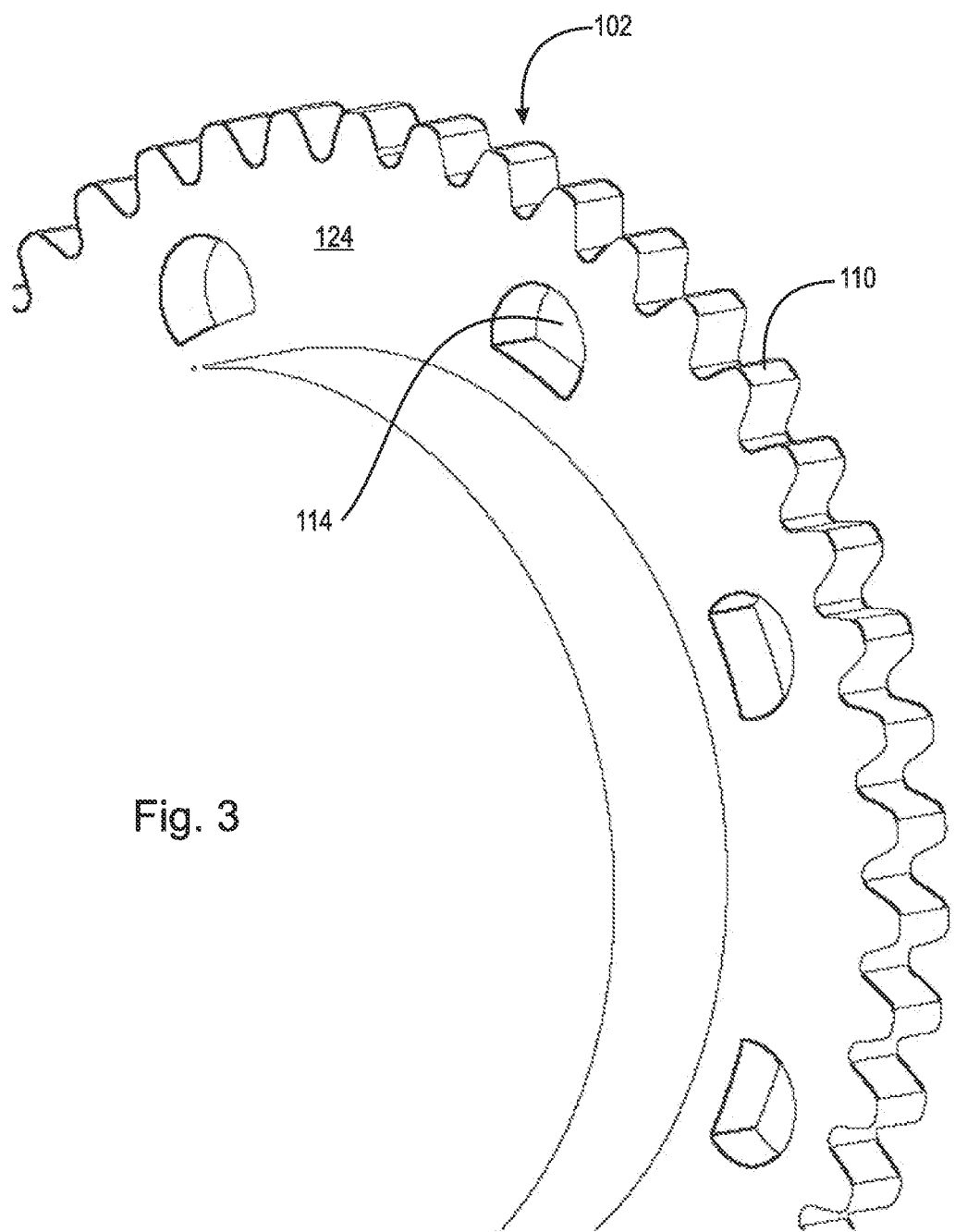
FIG. 3 is partial perspective view of a sprocket in FIG. 1.
Figure 4:
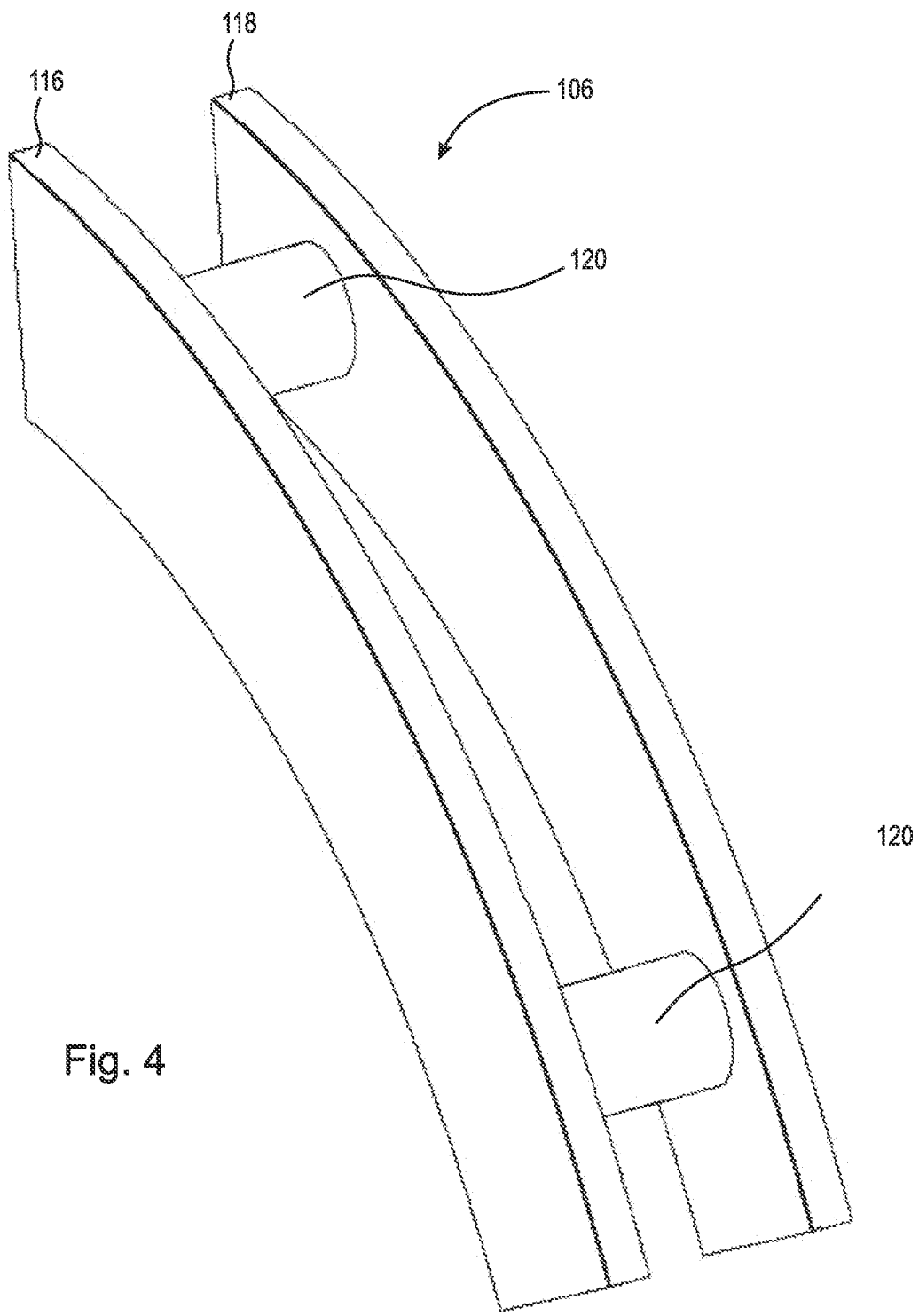
FIG. 4 is a perspective view of a pendulum mass; and,
FIG. 5 is a schematic block diagram of an engine with a timing chain assembly.

FIG. 1 is a front view of a chain or belt drive assembly.
FIG. 2 is detail of area 2 in FIG. 1.
FIG. 3 is partial perspective view of a sprocket in FIG. 1.
FIG. 4 is a perspective view of a pendulum mass. The following should be viewed in light of FIGS. 1 through 4. Chain or belt drive assembly 100 includes sprockets 102 and 104, at least one pendulum mass assembly 106, camshaft 107 non-rotatably connected to continuous chain or belt 108. Sprockets 102 and 104 include radially outwardly extending protrusions 110 and 112, respectively, engaged with the chain or belt. Sprocket 102 includes at least one opening 114 passing through material forming sprocket 102 and wholly surrounded by the material forming sprocket 102. Each pendulum mass assembly 106 includes pendulum masses 116 and 118 and at least one connection element 120. Mass 116 is disposed on radial side 122 of sprocket 102, and pendulum mass 118 is disposed radial side 124, opposite radial side 122 of sprocket 102. The at least one connection element is fixedly secured to masses 116 and 118 and passing through the at least one opening. The at least one connection element is displaceable within the at least one opening in radial directions 126 and 128 and in circumferential directions 130 and 132 (with respect to axis of rotation 134 for sprocket 102).

Figure 5:
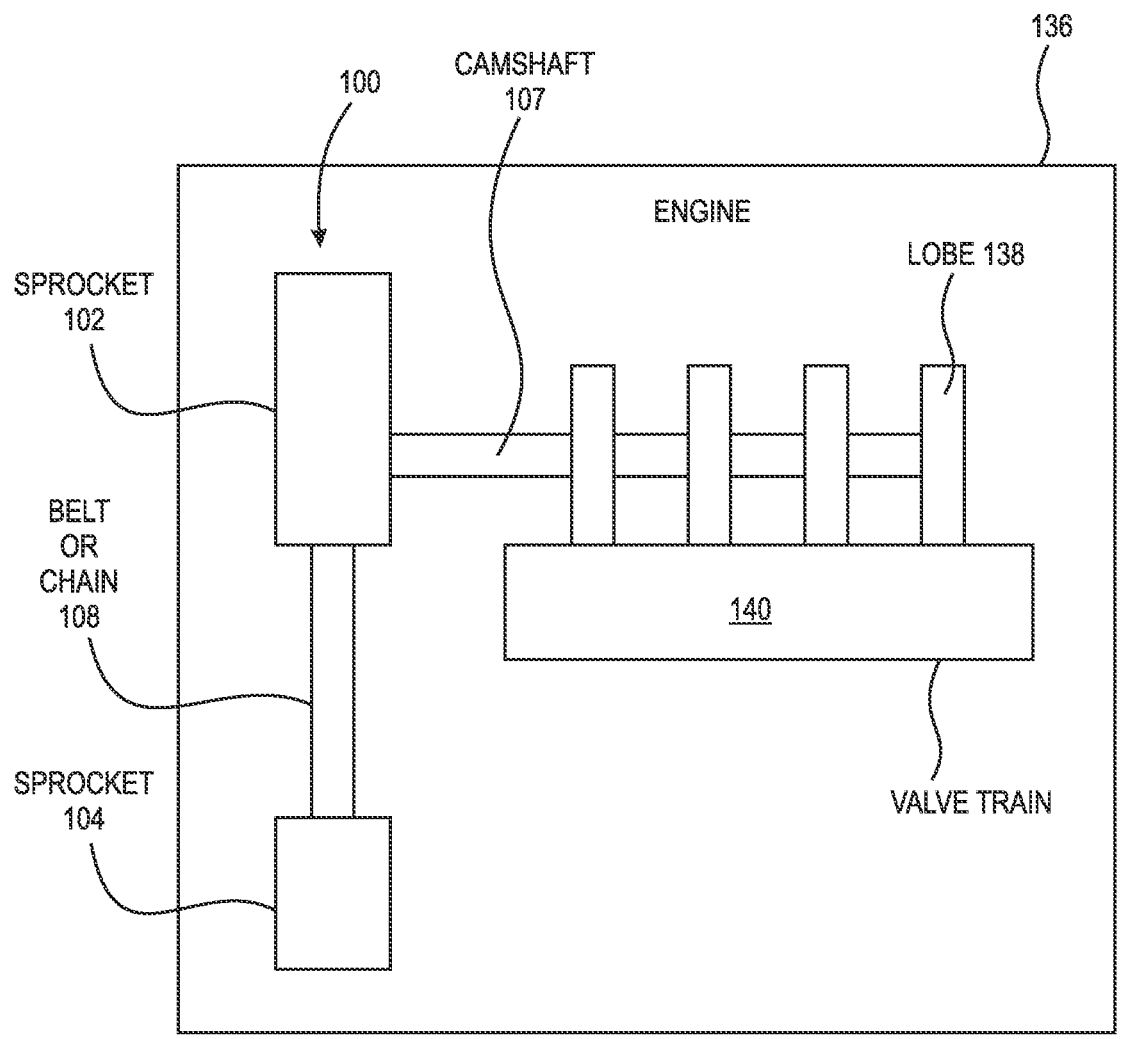

FIG. 5 is a schematic block diagram of an engine with a timing chain assembly. The following should be viewed in light of FIGS. 1 through 5. In an example embodiment, assembly 100 is an engine timing chain assembly for engine 136. Camshaft 107 includes a plurality of lobes 138 that control operation of valve train 140. Four lobes are shown for purposes of illustration; however, it should be understood that any number of lobes are possible.

In an example embodiment, the at least one opening includes a plurality of openings 114 and the at least one pendulum mass assembly includes a plurality of pendulum mass assemblies 106. Each pendulum mass assembly includes a respective pendulum mass 116, a respective pendulum mass 118, and a respective at least one connection element fixedly secured to the respective masses 116 and 118 and passing through a respective at least one opening 114.

In an example embodiment, the at least one opening passing includes openings 114A and 114B and the at least one connection element includes connection elements 120A and 120B passing through openings 114A and 114B, respectively. Connection element 120A is displaceable within opening 114A in the directions 126, 128, 130, and 132, and connection element 120B is displaceable within opening 114B in directions 126, 128, 130, and 132.

In an example embodiment, the at least one opening includes respective pairs of openings 114A and 114B and the at least one connection element includes respective pairs of connection elements 120A and 120B. As noted above, each connection element 120A passes through a respective opening 114A and is displaceable within the respective opening 114A in directions 126, 128, 130, and 132. As noted above, each connection element 120B passes through a respective opening 114B and is displaceable within the respective opening 114B in directions 126, 128, 130, and 132.

In an example embodiment, mass 116 and/or mass 118 have uniform dimension 142 in radial direction 126 or 128. In an example embodiment, mass 116 and/or mass 118 have uniform dimension 144 in circumferential direction 130 or 132. In an example embodiment, assembly 100 includes tensioner 146 including actuator 148, blade 150 and guide 152. Blade 150 and guide 152 are each in contact with the belt or chain. Actuator 148 is arranged to displace the blade to control a tension of the belt or chain.

Advantageously, assemblies 106 attenuate undesirable torque variation for the camshaft and undesirable vibration of the chain or belt due to torque variation for the camshaft. For example, assemblies 106 attenuate undesirable torque variation for camshaft 107 associated with operation, in particular oscillation, of an internal combustion engine arranged for connection to assembly 100. Assemblies 106 also attenuate undesirable vibration of the chain or belt due to torque variation for the camshaft. For example, as noted above, when assembly 100 is an engine timing chain, the torque variation is typically dominated by second, third, and fourth order oscillations for four cylinder, six cylinder, and eight cylinder engines, respectively. The chain vibration also is dominated by the preceding oscillations. To attenuate the torque variation and chain vibration, the configuration and parameters of the components of assembly 106 can be selected as follows:

1. Select the number of openings in pairs on sprocket 102. For example, select one, or two, or three pairs of openings in sprocket 102 based on the total mass of pendulum required to dampen the angular oscillation of the sprocket.
2. Select dimensions of openings 114 and locations of openings 114 in sprocket 102;
3. Select masses and dimensions of masses 116 and 118;
4. Selecting masses and dimensions of connection elements 120; or,
5. Select locations of connection points for connection elements 120 on masses 116 and 118.

According to aspects illustrated herein, there is provided a method of fabricating a chain or belt drive assembly. The following should be viewed in light of FIGS. 1 through 5. Although the method is presented as a sequence of steps for clarity, no order should be inferred from the sequence unless explicitly stated. A first step fixedly secures at least one connection element, such as element 120, to at least one pendulum mass, such as mass 116. A second step passes the at least one connection element, such as element 120, through at least one opening, such as opening 114 in a sprocket, such as sprocket 102. The at least one opening passing through material forming the sprocket and is wholly surrounded by the material forming the first sprocket.

A third step disposes the at least one pendulum mass on a radial side of the sprocket, for example, disposing mass 116 on side 122. A fourth step fixedly secures the at least one connection element to at least one other pendulum mass, such as mass 118, disposed on another radial side of the sprocket, such as side 124. A fifth step engages a continuous chain or belt, such as chain or belt 108 with a plurality of radially outwardly extending protrusions, such as protrusions 110 on a sprocket such as sprocket 102. A sixth step engages the continuous chain or belt with a plurality of radially outwardly extending protrusions, such as protrusions 112, on another sprocket, such as sprocket 104. The at least one connection element is displaceable within the at least one opening in radial and circumferential directions, such as directions 126, 128, 130, and 132.

In an example embodiment: fixedly securing the at least one connection element to at least one pendulum mass includes securing two respective connection elements, such as 120A and 120B, to each pendulum mass, such as masses 116 and 118, from a plurality pendulum masses; and passing the at least one connection element through at least one opening in the sprocket includes passing the two respective connection elements through respective openings, such as openings 114A and 114B, in the sprocket such as sprocket 102. In an example embodiment: fixedly securing the at least one connection element to the at least one other pendulum mass includes fixedly securing the two respective connection elements to two respective other pendulum masses, such as mass 118, from a plurality of other pendulum masses. The respective connection elements are displaceable within the respective openings in the radial and circumferential directions, such as directions 126, 128, 130, and 132. The respective other connection elements are displaceable within the respective other openings in the radial and circumferential directions, such as directions 126, 128, 130, and 132.

In an example embodiment, the method includes: selecting a number of openings, such as openings 114, in the sprocket, such as sprocket 102, to attenuate torque variation and vibration associated with operation of an internal combustion engine arranged for connection to the chain or belt drive assembly; or selecting dimensions of the at least one opening and a location of the at least one opening in the sprocket to attenuate torque variation and vibration associated with operation of an internal combustion engine arranged for connection to the chain or belt drive assembly; or, selecting respective masses and dimensions of the at least one pendulum mass, such as mass 116, the at least one other pendulum mass, such as mass 118, and the at least one connection element, such as element 120, to attenuate torque variation and vibration associated with operation of an internal combustion engine arranged for connection to the chain or belt drive assembly; or, selecting respective locations of connection points of the at least one connection element, such as element 120, to the at least one pendulum mass, such as mass 116, and the at least one other pendulum mass, such as mass 118, to attenuate torque variation and vibration associated with operation of an internal combustion engine arranged for connection to the chain or belt drive assembly.

In an example embodiment, the method includes engaging a blade, such as blade 150, and a guide, such as guide 152, for a tensioner, such as tensioner 146, with the belt or chain, such as belt or chain 108. The tensioner includes actuator 148 arranged to displace the blade to control a tension of the belt or chain.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A chain or belt drive assembly, comprising:
   a first sprocket including:
      a first plurality of radially outwardly extending protrusions; and,
      at least one opening passing through material forming the sprocket and wholly surrounded by the material forming the first sprocket;
   a camshaft non-rotatably connected to the first sprocket;
   a second sprocket including a second plurality of radially outwardly extending protrusions;
   a continuous chain or belt engaged with the first and second pluralities of protrusions; and,
   at least one pendulum mass assembly including:
      a first pendulum mass disposed on a first radial side of the first sprocket;
      a second pendulum mass disposed on a second radial side, opposite the first radial side, of the first sprocket; and,
      at least one connection element fixedly secured to the first and second pendulum masses and passing through the at least one opening, wherein:
   the at least one connection element is displaceable within the at least one opening in radial and circumferential directions.

2. The assembly of claim 1, wherein:
   the at least one opening includes a plurality of openings;
   the at least one pendulum mass assembly includes a plurality of pendulum mass assemblies;
   each pendulum mass assembly in the plurality of pendulum mass assemblies includes:
      a respective first pendulum mass disposed on the first radial side of the first sprocket;
      a respective second pendulum mass disposed on the second radial side, opposite the first radial side, of the first sprocket; and,
      at least one respective connection element fixedly secured to the respective first and second pendulum masses and passing through a respective at least one opening from the plurality of openings; and,
   the at least one respective connection element is displaceable within the respective at least one opening in the radial and circumferential directions.

3. The assembly of claim 1, further comprising
   a tensioner including an actuator, a blade in contact with the belt or chain, and a guide in contact with the belt or chain, wherein:
   the actuator is arranged to displace the blade to control a tension of the belt or chain.

4. The assembly of claim 1, wherein
   the at least one opening passing includes first and second openings;
   the at least one connection element includes first and second connection elements passing through the first and second openings, respectively;
   the first connection element is displaceable within the first opening in the radial and circumferential directions; and,
   the second connection element is displaceable within the second opening in the radial and circumferential directions.

5. The assembly of claim 1, wherein:
   the at least one opening includes respective pairs of first and second openings;
   the at least one connection element includes respective pairs of first and second connection elements;
   each first connection element passes through a respective first opening;
   each second connection element passes through a respective second opening;
   each first connection element is displaceable within the respective first opening in the radial and circumferential directions; and,
   each second connection element is displaceable within the respective second opening in the radial and circumferential directions.

6. The assembly of claim 1, wherein:
   the chain or belt drive assembly is an engine timing chain arranged for installation in an internal combustion engine; and,
   the camshaft includes a plurality of lobes arranged to control a valve train for the internal combustion engine.

7. The assembly of claim 1, wherein the first or second pendulum mass has a uniform dimension in a radial direction orthogonal to an axis of rotation for the first sprocket.

8. A method of fabricating chain or belt drive assembly, comprising:
   fixedly securing at least one connection element to at least one first pendulum mass;
   passing the at least one connection element through at least one opening in a first sprocket, the at least one opening passing through material forming the sprocket and wholly surrounded by the material forming the first sprocket;
   disposing the at least one first pendulum mass on a first radial side of the first sprocket;

fixedly securing the at least one connection element to at least one second pendulum mass disposed on a second radial side of the first sprocket, opposite the first radial side;

non-rotatably connecting a camshaft to the first sprocket;

engaging a continuous chain or belt with a first plurality of radially outwardly extending protrusions on the first sprocket; and, engaging the continuous chain or belt with a second plurality of radially outwardly extending protrusions on a second sprocket, wherein:

the at least one connection element is displaceable within the at least one opening in radial and circumferential directions.

9. The method of claim 8, wherein:

fixedly securing the at least one connection element to the at least one first pendulum mass includes securing respective first and second connection elements to each first pendulum mass from a plurality of first pendulum masses;

passing the at least one connection element through the at least one opening in the first sprocket includes passing the respective first and second connection element through respective first and second openings in the first sprocket;

fixedly securing the at least one connection element to the at least one second pendulum mass includes fixedly securing the respective first and second connection elements to respective second pendulum masses from a plurality of second pendulum masses;

the respective first connection elements are displaceable within the respective first openings in the radial and circumferential directions; and, the respective second connection elements are displaceable within the respective second openings in the radial and circumferential directions.

10. The method of claim 8, further comprising:

selecting a number of openings included in the at least one opening to attenuate torque variation and vibration associated with operation of an internal combustion engine arranged for connection to the chain or belt drive assembly; or, selecting dimensions of the at least one opening and a location of the at least one opening in the first sprocket to attenuate torque variation and vibration associated with operation of an internal combustion engine arranged for connection to the chain or belt drive assembly; or, selecting respective masses and dimensions of the at least one first and second pendulum masses and the at least one connection element to attenuate torque variation and vibration associated with operation of an internal combustion engine arranged for connection to the chain or belt drive assembly; or, selecting respective locations of connection points of the at least one connection element to the at least one first and second pendulum masses to attenuate torque variation and vibration associated with operation of an internal combustion engine arranged for connection to the chain or belt drive assembly.

11. The method of claim 8, further comprising:

engaging a blade and a guide for a tensioner with the belt or chain, wherein the tensioner includes an actuator arranged to displace the blade to control a tension of the belt or chain.

12. The method of claim 8, wherein:

the chain or belt drive assembly is an engine timing chain arranged for installation in an internal combustion engine; and, the camshaft includes a plurality of lobes arranged to control a valve train for the internal combustion engine.

13. An engine timing chain assembly, comprising:

a first sprocket including:

a first plurality of radially outwardly extending protrusions; and, a plurality of pairs of first and second openings, each first and second opening passing through material forming the sprocket and wholly surrounded by the material forming the first sprocket;

a second sprocket including a second plurality of radially outwardly extending protrusions;

a continuous chain or belt engaged with the first and second pluralities of protrusions; and, a plurality of pendulum mass assemblies, each pendulum mass assembly including:

a respective first pendulum mass disposed on a first radial side of the first sprocket;

a respective second pendulum mass disposed on a second radial side, opposite the first radial side, of the first sprocket; and, a respective pair of first and second connection elements fixedly connected to the respective first and second pendulum masses, wherein:

each first connection element passes through a respective first opening;

each second connection element passes through a respective second opening;

said each first connection element is displaceable within the respective first opening in radial and circumferential directions; and, said each second connection element is displaceable within the respective second opening in the radial and circumferential directions.

* * * * *